United States Patent [19]

Lew

[11] Patent Number: 5,036,240
[45] Date of Patent: Jul. 30, 1991

[54] IMPULSE SENSOR WITH MECHANICAL PREAMPLIFICATION AND NOISE CANCELLATION

[76] Inventor: Hyok S. Lew, 7890 Oak St., Arvada, Colo. 80005

[21] Appl. No.: 219,744

[22] Filed: Jul. 18, 1988

[51] Int. Cl.⁵ .............................................. H01L 41/08
[52] U.S. Cl. .................................... 310/338; 310/319; 73/861.23; 73/861.24; 73/862.68
[58] Field of Search ............... 310/323, 324, 328, 338, 310/339; 73/DIG. 4, 861.22, 861.23, 861.24, 862.68

[56] References Cited

U.S. PATENT DOCUMENTS

| 2,250,496 | 7/1941 | Postlethwaite | 310/338 |
| 4,258,565 | 3/1981 | Sawayama et al. | 310/338 X |
| 4,262,544 | 4/1981 | Herzl | 73/861.24 |
| 4,625,564 | 12/1986 | Murakami et al. | 73/861.24 |
| 4,776,222 | 10/1988 | Lew | 310/338 X |

FOREIGN PATENT DOCUMENTS 979919 12/1982 U.S.S.R. .............................. 310/323

Primary Examiner—Mark O. Budd

[57] ABSTRACT

An impulse sensor comprises a Piezo electric element disposed intermediate a thin end wall and a thick end wall of a container vessel in a pressurized relationship, wherein an impulse transmitting member extends from the thin end wall, which impulse transmitting member transmits impulses exerted onto the extremity thereof to the Piezo electric element.

11 Claims, 3 Drawing Sheets

IMPULSE SENSOR WITH MECHANICAL PREAMPLIFICATION AND NOISE CANCELLATION

BACKGROUND OF THE INVENTION

The measurement technology has been in transition in this decade, wherein measuring instruments detecting digital signals naturally appearing in physical systems such as the vortex shedding flowmeter, the vibrating tube mass flowmeter, and the digital pressure sensor have started to play a dominant role in industrial measurement technology. The level of performance of such instruments directly depends on the sensitivity and accuracy of the sensor detecting the digital signals in the physical systems.

BRIEF SUMMARY OF THE INVENTION

The primary object of the present invention is to provide an impulse sensor comprising a Piezo electric disposed intermediate a thin wall and a thick wall of a container in a pressurized relationship, wherein an impulse transmitting member extends from the thin wall, which transmits impulses exerted onto the extremity thereof to the Piezo electric element.

Another object is to provide an impulse sensor comprising a Piezo electric element that has two electrodes disposed in an asymmetric arrangement about a plane including the central axis of the impulse transmitting member, wherein two balanced gain amplifiers respectively connected to the two asymmetric electrodes cancel noises in combining the two signals therefrom.

A further object is to provide an impulse sensor comprising a Piezo electric element that has three electrodes, wherein one of the three electrodes is disposed symmetrically about a plane including the central axis of the impulse transmitting member. The two signals from the other two electrodes respectively disposed on the two opposite sides of the plane are combined in such a way that the noises are cancelled therebetween and, then, the so combined signal is further combined with the signal from the symmetric electrode to further eliminate the noises.

Yet another object is to provide an impulse sensor comprising a pair of stacked Piezo electric elements disposed intermediate a thin wall and a thick wall of a container in a pressurized relationship wherein an impulse transmitting member extends from the thin wall. The two stacked Piezo electric elements are polarized in the same direction perpendicular to the thin wall of the container and the adjacent faces of the two stacked Piezo electric elements respectively include a pair of electrodes disposed asymmetrically about a plane including the central axis of the impulse transmitting member, wherein the first electrode of the first Piezo electric element on one side of the central axis of the impulse transmitting member and the second electrode of the second Piezo electric element on the other side of the central axis partially over-lap one another and are electrically connected to one another, and the second electrode of the first Piezo electric element on the other side of the central axis and the first electrode of the second Piezo electric element on one side of the central axis partially over-lap one another and are electrically connected to one another. The two signals from the two combinations of the electrodes are combined in such a way that the noises are cancelled therebetween.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
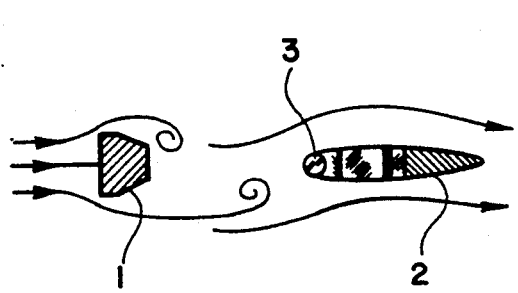
FIG. 1 illustrates a cross section of an embodiment of the vortex shedding flowmeter comprising a vortex generating bluff body and a vortex sensing planar member coupled to the impulse transmitting member of an impulse sensor.

In FIG. 1 there is illustrated a cross section of a schematic embodiment of the vortex sensing flowmeter comprising a vortex generating bluff body 1 of an elongated cylindrical shape having a constant cross section and a vortex sensing planar member 2 disposed generally parallel to the bluff body 1 at a downstream location, wherein the planar member 2 is secured to the rigid wall of the flow passage at at least one extremity thereof and coupled to an impulse transducer by a mechanical coupling means 3 disposed at a position of the planar member 2, where the alternating lift forces on the planar member created by the vortices shed from the bluff body 1 produce alternating deflections of the maximum amplitude.

Figure 2:
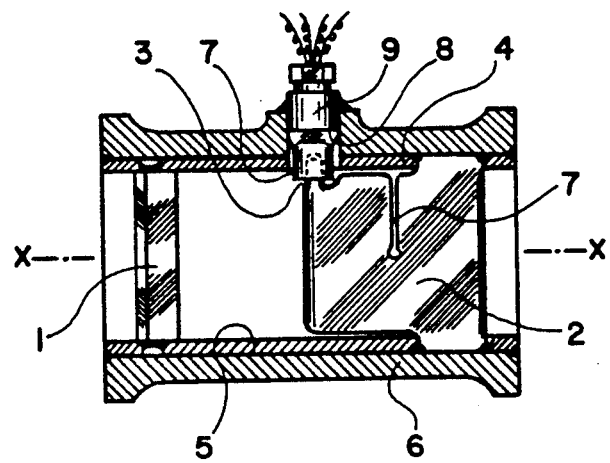
FIG. 2 illustrates another cross section of the vortex shedding flowmeter shown in FIG. 1.

In FIG. 2 there is illustrated a cross section of the vortex shedding flowmeter invented by this inventor, which employs the schematic embodiment shown in FIG. 1. The downstream portions of the two extremities of the planar member 2 are secured to the wall of the sleeve 4 inserted into the bore 5 included in the flowmeter body 6 in a pressure fit relationship. The free extremity of the upstream half of the planar member 2 partially separated from the downstream half thereof by the slit 7 is connected to the impulse transmitting member extending from a thin end wall 8 of the transducer container vessel 9 by a mechanical coupling 3 comprising an extension affixed to the free extremity of the upstream half of the planar member 2, which engages a socket included in the extremity of the impulse transmitting member in a close tolerance. The frequency of the alternating lift forces on the planar member that is the same as the vortex shedding frequency, determines the fluid velocity as it is proportional to the fluid velocity, and the amplitude of the alternating lift forces on the planar member determines the dynamic pressure of the fluid flow as it is proportional to the fluid density times the square of the fluid velocity. The information on the fluid velocity and the dynamic pressure provided by the alternating electromotive forces from the transducer generated by the alternating lift forces on the vortex sensing planar member 2 is combined to determine the volume flow rate, mass flow rate and the fluid density. The vortex shedding flowmeter shown in FIG. 2 has a turn-down ratio close to 100 to 1, which is the ratio of the maximum to the minimum velocity measurable with the flowmeter. The 100 to 1 turn-down ratio of the vortex shedding flowmeter invented by this inventor is a remarkable accomplishment, as the best of the existing vortex shedding flowmeters has a turn-down ratio equal to 20 to 1 at most.

Figure 3:
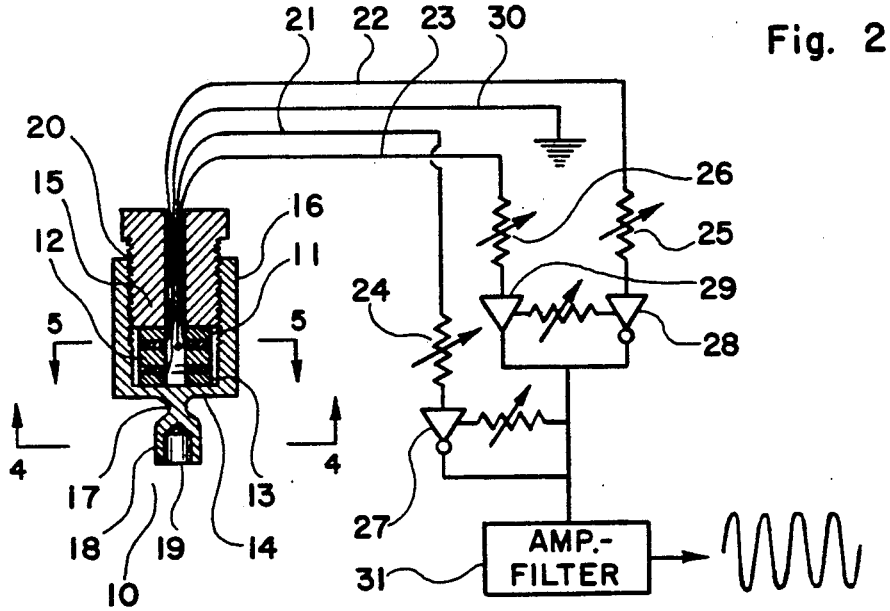
FIG. 3 illustrates a cross section of an embodiment of the impulse sensor of the present invention and circuit diagrams employed to refine the signals therefrom.

In FIG. 3 there is illustrated a cross section of an embodiment of the impulse sensor of the present invention, that is employed to the vortex shedding flowmeter shown in FIG. 2 as the transducer member 9. The impulse sensor 10 comprises a stack of an insulator disc 11, a planar Piezo electric element 12 and another insulator disc 13 disposed intermediate a thin end wall 14 and a thick end wall or plug 15 of the transducer container vessel 16 in a pressurized arrangement. The thin end wall 14 includes a rib 17 disposed diametrically thereacross, from which rib 17 an impulse transmitting member 18 extends, which rib 17 reinforces the thin end wall 14 against the pressure exerted thereon by the plug 17 threadedly engaging the open end 20 of the container vessel 16. The free extremity of the impulse transmitting member 18 includes a first half 19 of the mechanical coupling means such as a socket that receives a ball or post member affixed to the vortex sensing planar member in a close tolerance. Of course, the socket 19 may be replaced with a ball or post member that engages a socket or hole included in the vortex sensing planar member. The cylindrical surface of the transducer elements 11, 12 and 13 are separated from the cylindrical wall of the cavity housing those elements, whereby the major portion of the stress coupled or torque induced in the thin end wall 14 from the lateral force exerted on the extremity of the impulse transmitting member 18 is transmitted to the Piezo electric element 12. The first face of the Piezo electric element 12 adjacent to the insulator disc 11 has three electrodes respectively including three wires 21, 22, and 23 extending therefrom, which wires including resistors 24, 25 and 26 are connected to the noise balancing amplifiers 27, 28 and 29, respectively. The second face of the Piezo electric element 12 adjacent to the insulator disc 13 has a single electrode that is grounded by a wire 30 extending therefrom. The output signals from the amplifiers 27, 28 and 29 are fed to a signal conditioning amplifier-filter 31, which is connected to an electronic data processor that is not shown.

Figure 4:
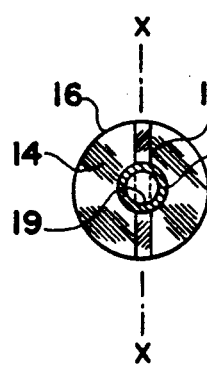
FIG. 4 illustrates another cross section of the embodiment shown in FIG. 3.

In FIG. 4 there is illustrated another cross section of the impulse sensor shown in FIG. 3, that is taken along plane 4—4 as shown in FIG. 3. The thin end wall 14 of the transducer container vessel 16 includes a rib 17 built thereon and disposed diametrically thereacross. The impulse transmitting member 18 including a mechanical coupling means 19 at the extremity thereof is affixed to the rib 17 in a coaxial arrangement with respect to the thin end wall 14 and extends therefrom. The rib 17 is disposed on a plane including the central axis X—X of the flow passage.

Figure 5:
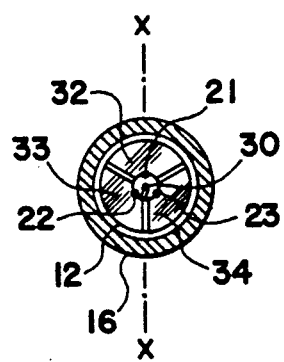
FIG. 5 illustrates a further cross section of the embodiment shown in FIG. 3.

In FIG. 5 there is illustrated a further cross section of the impulse sensor shown in FIG. 3, that is taken along plane 5—5 as shown in FIG. 3. The electrodes included on the first face of the Piezo electric element 12 are a first electrode 32 disposed symmetrically about a plane including the rib 17 and connected to the wire 21, and a second and third electrode 33 and 34 respectively disposed on the two opposite sides of the plane including the rib 17 and connected to the two wires 22 and 23, respectively. The wire 30 is connected to the single electrode included in the second face of the Piezo electric element 12.

Figure 6:
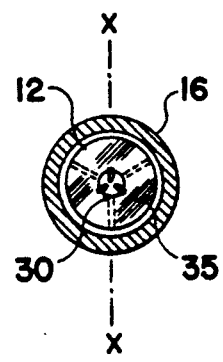
FIG. 6 illustrates the other side of the Piezo electric element shown in FIG. 5.

In FIG. 6 there is illustrated a cross section of the impulse sensor shown in FIG. 3, which cross section shows the second side of the Piezo electric element 12, which includes a single electrode 35 covering the entire surface area of the second face and connected to the wire 30 that is grounded as shown in FIG. 3.

A lateral force exerted on the free extremity of the impulse transmitting member 18 in a direction perpendicular to the plane including the rib 17 produces a stress couple or torque about an axis generally coinciding with the line of intersection between the thin end wall 14 and the rib 17, that pushes in one half of the thin end wall 14 and pulls out the other half, which in turn increases the compression experienced by one half of the Piezo electric element 17 and decreases the compression experienced by the other half, which two halves are on the two opposite sides of the plane including the rib 17. As a consequence, the two electrodes 33 and 34 disposed on the two opposite sides of the plane including the rib 17 respectively generate two electromotive forces of opposite signs with amplitudes proportional to the magnitude of the lateral force exerted on the free extremity of the impulse transmitting member 18. The electrode 32 disposed symmetrically about the plane including the rib 17 does not generate any net electromotive force from the lateral force exerted on the impulse transmitting member 18, as the two halves thereof on the two opposite sides of the plane including the rib 17 respectively generate two electromotive forces of opposite signs, which cancel one another. The compressive forces exerted on the impulse transmitting member 18 or the plug 15 in a direction perpendicular to the thin end wall 14 generate electromotive forces of the same sign from all three electrodes 32, 33 and 34. By adding the two signals from the two electrodes 33 and 34 differentially after balancing out the noises therebetween by adjusting the relative gains between the inverting amplifier 28 and the noninverting amplifier 29 or by using the variable resistors 25 and 26, a pure signal representing the vortex shedding phenomena is obtained in the form of alternating electromotive forces, wherein the frequency is proportional to the fluid velocity and the amplitude is proportional to the dynamic pressure of the fluid flow that is equal to one half of the fluid density times the square of the fluid velocity. Once the coefficients of the proportionality are determined empirically, the volume flow rate, mass flow rate and the fluid density are determined from the frequency and amplitude of the signals from the impulse sensor 10. The synthesized signal through the balanced gain amplifiers 28 and 29 may be further refined by canceling out the residual noises by noise balancing between the synthesized signal and the noise signal from the symmetric electrode 32. The resistors 24, 25 and 26 may be constant resistors attenuating the ringing oscillations induced by the noises.

Figure 7:
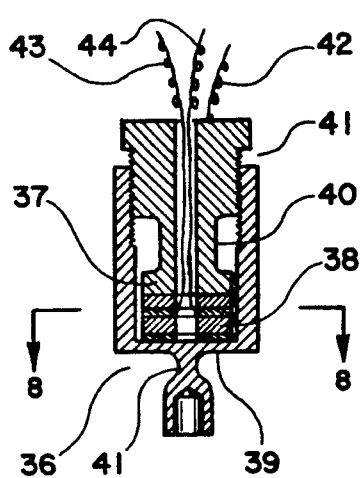
FIG. 7 illustrates a cross section of another embodiment of the impulse sensor of the present invention.

In FIG. 7 there is illustrated a cross section of another embodiment of the impulse sensor 36, that has essentially the same construction and elements as the embodiment shown in FIG. 3 with a few exceptions. The threaded plug or thick wall 37 pressing the Piezo electric element 38 to the thin end wall 39 has a midsection 40 with a reduced cross section. One face of the Piezo electric element 38 adjacent to the end face of the threaded plug 37 has two electrodes disposed in an asymmetric arrangement about a plane including the rib 41, while the single electrode included in the other face of the Piezo electric element 38 is under direct contact with the thin end wall 39, wherein the metalic transducer container 41 includes a grounding wire 42. The two wires 43 and 44 respectively extending from the two asymmetric electrodes of the Piezo electric element 38 are respectively connected to an inverting amplifier and noninverting amplifier such as the elements 28 and 29 shown in FIG. 3, wherein the noises are balanced therebetween.

Figure 8:
FIG. 8 illustrates another cross section of the embodiment shown in FIG. 7.

In FIG. 8 there is illustrated another cross section of the impulse sensor 36 shown in FIG. 7, that is taken along plane 8—8 as shown in FIG. 7. The first face of the Piezo electric element 38 shown in FIG. 8 has two electrodes 45 and 46 disposed in an asymmetric arrangement about a plane inlcuding the rib 41 that is parallel to the central axis of the flow passage, which two asymmetric electrodes are respectively connected to the two wires 43 and 44. As the threaded plug 37, through which a major portion of the noise generating mechanical vibrations associated with the pipe line vibration are transmitted to the Piezo electric element 38, has a midsection of a coaxially reduced cross section, the central portion of the Piezo electric element 38 is more sensitive to the noises transmitted through the threaded plug 37 with a thinned down midsection, while the peripherial portions of the Piezo electric element 38 away from the plane including the rib 41 are more sensitive to the vortex signals transmitted through the impulse transmitting member. As a consequence, the minor electrode 45 picks up a less amount of noises compared with the major electrode 46, while the two electrodes 45 and 46 pick up the vortex signals at the same level, i.e., $$V_{MINOR} = S + \alpha N, \quad (1)$$

$$V_{MAJOR} = -S + N, \quad (2)$$

where V stands for the total signal, S for the vortex signal and N for the noise signal, and $\alpha$ is a numerical parameter that is less than one for the asymmetric arrangement of the two electrodes shown in FIG. 8 and equal to one for the symmetric arrangement of the two electrodes. Elimination of N between the two equations (1) and (2) yields relationship $$S = \frac{V_{MINOR} - \alpha V_{MAJOR}}{1 + \alpha}. \quad (3)$$

According to the equation (3), the stronger vortex signal results from the value of $\alpha$ less than one compared with $\alpha$ equal to one. In other words, an asymmetrically arranged pair of electrodes as shown in FIG. 8 provides an advantage over a symmetrically arranged pair of electrodes. The other face of the Piezo electric element 38 opposite to the one shown in FIG. 8 has a single electrode covering the entire surface area thereof, which electrode may be under an electrically conducting contact with the thin end wall 39 as shown in FIG. 7, or may be insulated from the thin end wall 39 by an insulating disc placed therebetween and connected to a graounding wire as exemplified by the arrangement shown in FIG. 3.

Figure 9:
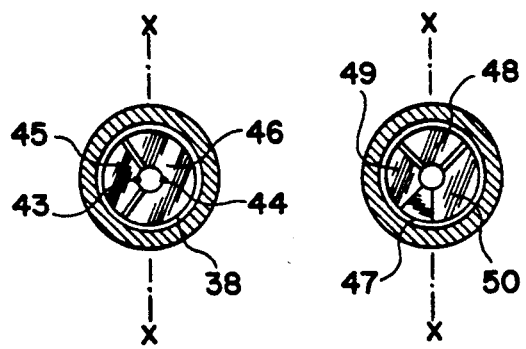
FIG. 9 illustrates a Piezo electric element usable in place of the Piezo electric element shown in FIG. 8.

In FIG. 9 there is illustrated a Piezo electric element 47 having three electrodes 48, 49 and 50 included in one face thereof and a single electrode included in the other face opposite to the one face shown, which has the same construction as the Piezo electric element 12 shown in FIG. 5 with one exception being that the signal sensing electrodes 49 and 50 are disposed on the two opposite sides of the plane including the rib 17 or 41 in an asymmetric arrangement, while the noise sensing electrode 48 is disposed symmetrically about the plane including the rib. The Piezo electric element 47 may be housed in a transducer container vessel shown in FIG. 3 or 7.

Figure 10:
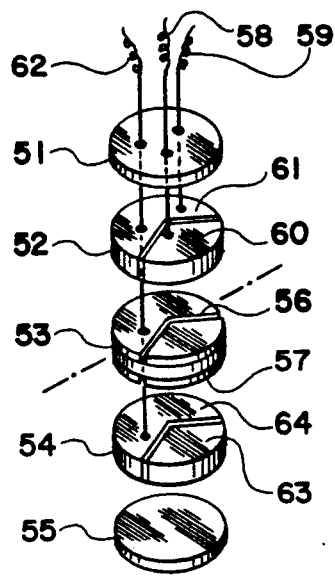
FIG. 10 illustrates an embodiment of packaging a single Piezo electric element sandiwiched between two conducting discs.

In FIG. 10 there is illustrated an exploded view of a stacked combination of transducer elements including a single Piezo electric element, which combination comprises an insulator disc 51, a conducting disc 52 with the asymmetrically divided halves, a Piezo electric element 53 with two asymmetric electrodes, a conducting disc 54 with two asymmetrically divided halves, and an insulator disc 55, which are stacked into a columnar assembly. The two asymmetric halves of each of the two conductor discs 52 and 54 are respectively under a pressurized and electrically conducting contact with the two asymmetric electrodes included in each of the two faces 56 and 57 of the Piezo electric element 53. The wires 58 and 59 extend from the two asymmetrically divided halves 60 and 61 of the conducting disc 52, which are electrically insulated from one another and through the insulator disc 51. The third wire 62 extends from one of the two asymmetrically divided halves 63 and 64 of the conducting disc 54, which are electrically insulated from one another, and through the Piezo electric element 53, conducting disc 52 and the insulating disc 51 in an electrically insulating arrangement. The electromotive forces from any two wires of the three wires can be combined to balance out the noises in the manner described in conjunction with FIG. 3. Instead of the asymmetric divisions of the conductor discs and the electrodes as shown in FIG. 10, symmetric divisions may be employed. The asymmetric divisions provide an advantage in view that it provides a signal enhancement as explained in conjunction with FIG. 8 as well as that it provides a better spacing between the wires in routing them through the Piezo electric element and the divided conducting disc. It should be understood that the divided conducting disc 54 may be replaced with an undivided conducting disc to ground the face 57 of the Piezo electric element 53 by grounding the wire 62 extending therefrom.

Figure 11:
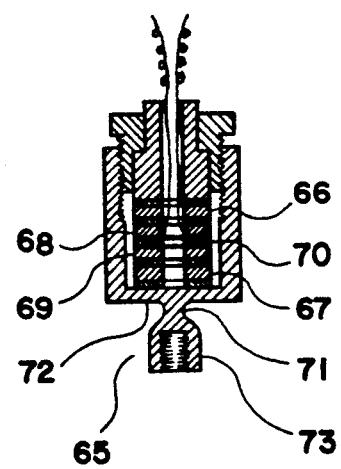
FIG. 11 illustrates a cross section of a further embodiment of the impulse sensor of the present invention.

In FIG. 11 there is illustrated a cross section of a further embodiment 65 of the impulse transducer of the present invention, which comprises dual Piezo electric elements 66 and 67 separated by a pair of conducting discs 68 and 69, which are electrically insulated from one another by an insulating disc 70, wherein the stack of those elements is assembled into a combination satisfying an appropriate geometric condition with respect to a plane including the rib 71 reinforcing the thin end wall 72, from which the impulse transmitting member 73 extends.

Figures 12, 14:
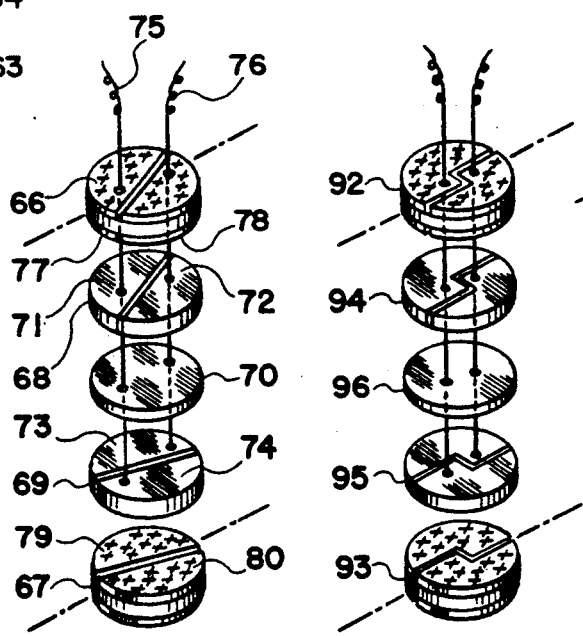
FIG. 12 illustrates an embodiment of packaging dual Piezo electric elements.
FIG. 14 illustrates a further embodiment of packaging dual Piezo electric elements.

In FIG. 12 there is illustrated an exploded view of an embodiment of the stacked combination of the transducer elements including dual Piezo electric elements, which combination comprises a first Piezo electric element 66, a first conductor disc 68 split into two halves electrically insulated from one another, an insulator disc 70, a second conductor disc 69 split into two halves electrically insulated from one another, and a second Piezo elelctric element 67. The first half 71 of the first conductor disc 68 and the second half 74 of the second conductor disc 69 partially over-lap one another and are connected to one another electrically by a first wire 75 extending through the insulator disc 70 and the first Piezo electric element 66 in an insulating relationship, while the second half 72 of the first conductor disc 68 and the first half 73 of the second conductor disc 69 partially over-lap one another and are connected to one another electrically by a second wire 76 extending through the insulator disc 70 and the first Piezo electric element 66 in an insulating relationship. One face of the first Piezo electric element 66 includes a pair of electrodes respectively under a pressurized contact with the two halves of the first conductor disc 68, while one face of the second Piezo electric element 67 includes a pair of electrodes respectively under a pressurized contact with the two halves of the second conductor disc 69. The two Piezo electric elements 66 and 67 are polarized in the same direction. The electrodes of the Piezo electric elements 66 and 67 respectively disposed at the two end faces of the columnar assembly of the elements are grounded to the metallic container vessel of the transducer elements. The electromotive force supplied through the first wire 75 is cogenerated by the first electrode 77 of the first Piezo eletric element 66 and the second electrode 80 of the second Piezo electric element 67 respectively disposed on the two opposite sides of a plane including the rib 71, while the electromotive force supplied through the second wire 76 is cogenerated by the second electrode 78 of the first Piezo electric element 66 and the first electrode 79 of the second Piezo electric element 67 respectively disposed on the two opposite sides of the plane including the rib 71. Since the electromotive force on each of the two wires 75 and 76 is generated by both halves of the stacked columnar assembly of the two Piezo electric elements, two electromotive forces respectively delivered through the two wires have a more precise antisymmetric relationship therebetween and, consequently, the noises are more accurately balanced out therebetween in combining the two electromotive forces by using inverting and noninverting amplifiers or by using variable resistors as described in conjunction with FIG. 3.

Figure 13:
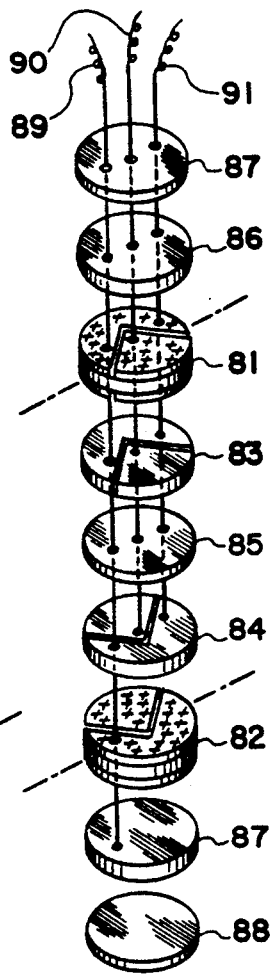
FIG. 13 illustrates another embodiment of packaging dual Piezo electric elements.

In FIG. 13 there is illustrated an exploded view of another embodiment of the stacked columnar assembly of the transducer elements comprising essentially the same stacked combinations of the two Piezo electric elements 81 and 82 separated by a pair of split conductor discs 83 and 84 electrically insulated from one another by an insulator disc 85 as the combination shown in FIG. 12 with a few exceptions, which are, firstly, the two electrodes included in each of the two Piezo electric elements and the two split halves of each of the conductor discs are asymmetrically arranged and, secondly, the stacked columnar assembly of the elements 81, 82, 83, 84 and 85 are sandwiched between two whole conductor discs 86 and 87, which are electrically insulated from the thin and thick end walls of the metallic container vessel by a pair of insulator discs 87 and 88, respectively, and connected to a common grounding wire 89 extending through all of the elements minus the insulator disc 88 in an insulating relationship. The two electromotive forces respectively delivered through the two wires 90 and 91 provide the same advantage as that described in conjunction with FIG. 12.

In FIG. 14 there is illustrated a stacked columnar assembly of the two Piezo electric elements 92 and 93 separated from one another by a pair of split conductor discs 94 and 95 insulated from one another by an insulator disc 96, which are assembled in the same arrangement and operating on the same principles as the assembly shown in and described with FIG. 12. In this embodiment, the two electrodes included in each face of the Piezo electric elements and the two split halves of each of the two conductor discs are axisymmetrically arranged about the central axis of the stacked columnar assembly, while the corresponding elements included in the embodiment shown in FIG. 12 are arranged in a planar symmetry about a plane including the central axis of the stacked columnar assembly.

Figure 15:
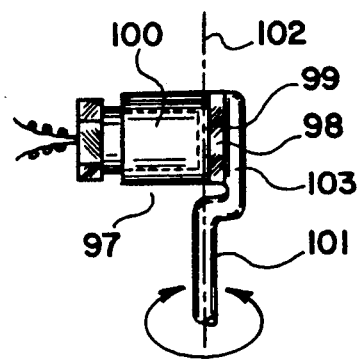
FIG. 15 illustrates an embidiment of a torsional impulse sensor of the present invention.

In FIG. 15 there is illustrated an impulse torque sensor 97 employing the same combination of the transducer container vessel and the transducer elements housed within a cavity therein as one of the combinations shown in FIGS. 3, 7 and 11 with one exception. In place of the impulse transmitting member extending from the rib 98 reinforcing the thin end wall 99 of the transducer container vessel 100, a torque transmitting member 101 with the central axis 102 disposed on a plane including the thin end wall 99 is rigidly affixed to the rib 98 by an off-set extremity thereof, which torque transmitting member 101 converts a torque about the axis 102 into a differential pressure acting on the two halves of the Piezo electric element housed in the transducer container vessel 100.

Figure 16:
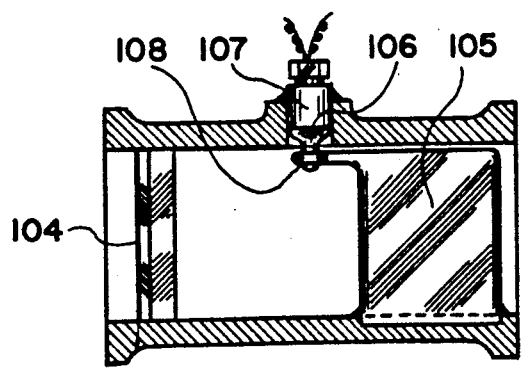
FIG. 16 illustrates a cross eection of an embodiment of the vortex shedding flowmeter invented by this inventor.

In FIG. 16, there is illustrated a cross section of an embodiment of the vortex shedding flowmeter invented by this inventor, which comprises a vortex generating bluff body 104 and a vortex sensing planar member 105 with one extremity secured to the wall of the flow passage and the other extremity connected to the impulse transmitting member 106 of the impulse sensor 107 of the present invention by a mechanical coupling 108.

Figure 17:
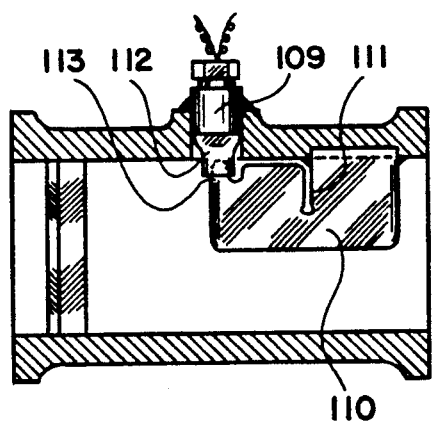
FIG. 17 illustrates a cross section of another embodiment of the vortex shedding flowmeter invented by this inventor.

In FIG. 17 there is illustrated a cross section of another embodiment of the vortex shedding flowmeter invented by this inventor, that employs the impulse sensor 109 of the present invention. The vortex sensing planar member 110 extending partially into the flow passage in a cantilever arrangement is secured to the wall by the downstream portion of one extremity thereof fixedly anchored to the wall of the flow passage. The upstream half of the vortex sensing planar member 110 is partially separated from the downstream half by a slit 111 and the unsecured upstream portion of the one extremity of the planar member 110 is connected to the impulse transmitting member 112 of the impulse sensor 109 by a mechanical coupling 113.

Figure 18:
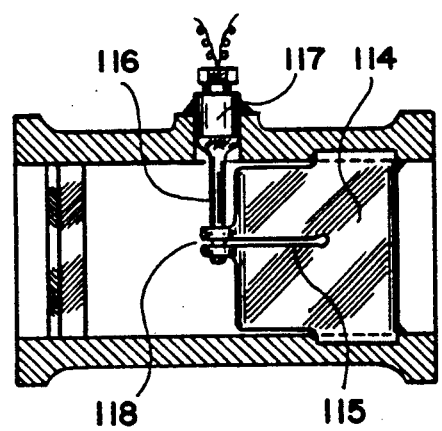
FIG. 18 illustrates a cross section of a further embodiment of the vortex shedding flowmeter invented by this inventor.

In FIG. 18 there is illustrated a cross section of a further embodiment of the vortex shedding flowmeter invented by this inventor, which comprises a vortex sensing planar member 114 secured to the wall of the flow passage at both extremities wherein the midsection thereof including a slit 115 partially separating the planar member 114 into two halves is connected to the impulse transmitting member 116 of the impulse sensor 117 of the present invention by a mechanical coupling 118.

Figure 19:
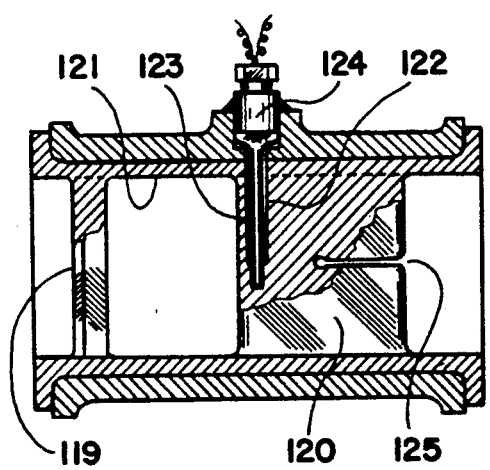
FIG. 19 illustrates a cross section of yet another embodiment of the vortex shedding flowmeter invented by this inventor.

In FIG. 19 there is illustrated a cross section of yet another embodiment of the vortex shedding flowmeter invented by this inventor, which comprises a vortex generating bluff body 119 and the vortex sensing planar member 120 which are integrally formed as part of the insertion liner 121. The leading edge of the planar member 120 includes a hole 122 engaged by the impulse transmitting member 123 of the impulse sensor 124 of the present invention in a clearance relationship, wherein the extremity of the impulse transmitting member 123 is secured to the blind end of the hole 122 at a midsection of the planar member 120. The midsection of the planar member 120 may include a slit 125 separating the downstream portion of the planar member 120 into two halves.

Figures 20, 21:
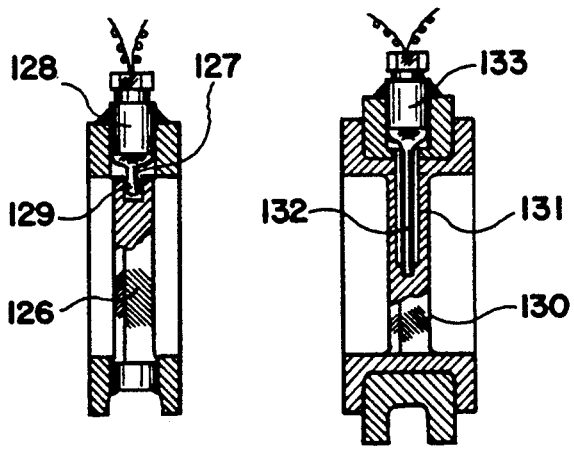
FIG. 20 illustrates a cross section of yet a further embodiment of the vortex shedding flowmeter invented by this inventor.
FIG. 21 illustrates a cross section of still another embodiment of the vortex shedding flowmeter invented by this inventor.

In FIG. 20 there is illustrated a cross section of an embodiment of the vortex shedding flowmeter invented by this inventor, that comprises a vortex generating-sensing bluff body 126, that is fixedly secured to the wall of the flow passage at one extremity and connected to the impulse transmitting member 127 of the impulse sensor 128 of the present invention by a mechanical coupling 129.

In FIG. 21 there is illustrated a cross section of another embodiment of the vortex shedding flowmeter invented by this inventor, that comprises a vortex generating-sensing bluff body 130 secured to the wall of the flow passage at both extremities, which includes a blind axial hole 131 engaged by the impulse transmitting member 132 of the impulse sensor 133 of the present invention in a clearance relationship, wherein the extremity of the impulse transmitting member 132 is secured to the blind end of the hole 131 at a midsection of the bluff body.

Figure 22:
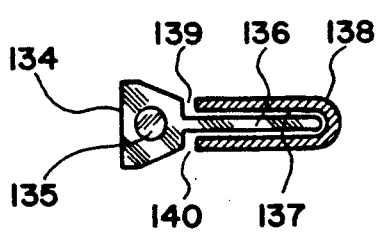
FIG. 22 illustrates a cross section of a vortex generator-sensor including a mechanical signal amplifying shielding invented by this inventor.

In FIG. 22 there is illustrated a cross section of a vortex generating-sensing bluff body 134 with a mechanical signal amplifying arrangement. The bluff body 134 including mechanical coupling means 135 for connecting to the impulse transmitting member of the impulse sensor of the present invention includes a planar trailing edge 136 engaging a planar cavity 137 included in an elongated generally planar shielding member 138 disposed parallel to the bluff body 134 immediately downstream thereof and rigidly secured to the wall of the flow passage at both extremities. The fluctuating fluid pressure at the two sides of the bluff body 134 accompanying the vortex shedding exerts alternating pressure loading on the planar trailing edge 136 through the gaps 139 and 140 between the blunt leading edge of the bluff body 134 and the open edge of the shielding member 138, which alternating pressure loading amplifies the alternating lift force on the bluff body created by the vortex shedding. As a consequence, the vortex generating-sensing bluff body with a planar trailing edge shielded by an elongated shielding member provides a greater sensitivity in measuring low fluid flow compared with a simple vortex generating-sensing bluff body.

Figure 23:
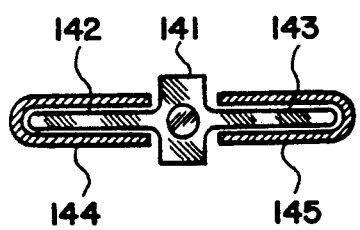
FIG. 23 illustrates a cross section of a bidirectional vortex generator-sensor including a mechanical signal amplifying shielding invented by this inventor.

In FIG. 23 there is illustrated a cross section of a vortex generating-sensing bluff body 141 including a planar leading edge 142 and planar trailing edge 145 respectively shielded by the two shielding members 144 and 145, which combination has a symmetric cross section about a plane including the central axis of the bluff body 141 and perpendicular to the direction of the fluid flow. As a consequence, the vortex generating-sensing bluff body combination shown in FIG. 23 measures bidirectional flow at an enhanced sensitivity level based on the same principles as those described in conjunction with FIG. 22.

The vortex shedding flowmeter is merely one example of many applications of the impulse sensor of the present invention, as it can be used to measure the rotary velocity of the turbine or paddle in the turbine or paddle flowmeters, and the oscillatory motion of the vibrating mechanical element employed in the vibrating tube mass flowmeters and resonating wire pressure transducers, etc.

While the principles of the present inventions have now been made clear by the illustrative embodiments, it will be immediately obvious to those skilled in the art that many modifications of structures, arrangements, proportions, elements and materials which are particularly adapted to the specific working environments and operating conditions in the practice of the inventions can be made without departing from those principles. It is not desired to limit the inventions to the particular illustrated embodiments shown and described and accordingly, all suitable modifications and equivalents may be resorted to falling within the scope of the inventions as defined by the claims which follow.

The embodiment of the invention in which an exclusive property or priviledge is claimed, are defined as follows:

1. A device for detecting forces comprising in combination:
   a) a container vessel including a cavity surrounded by a thin wall on one side and by rigid walls on other sides, wherein external surface of said thin wall includes a rib disposed diametrically thereacross;
   b) a force transmitting member extending from said thin wall for transmitting force laterally exerted thereon to said thin wall, wherein the central axis of said force transmitting member and the center plane of said rib are disposed generally on a common plane;

c) a planar Piezo electric element disposed generally parallel to said thin wall within said cavity and pressured towards said thin wall, said planar Piezo electric element including at least a pair of electrodes respectively disposed on two opposite sides of said common plane; and d) means for combining two signals respectively supplied by said pair of electrodes in such way that noises are canceled therebetween and electrical signal representing forces laterally exerted on said force transmitting member is extracted.

2. The combination as set forth in claim 1 wherein said pair of electrodes are disposed on one face of said planar Piezo electric element.

3. The combination as set forth in claim 2 wherein said pair of electrodes are disposed in an asymmetric arrangement about said common plane.

4. The combination as set forth in claim 1 wherein one of said pair of electrodes is disposed on one face of said planar Piezo electric element and the other of said pair of electrodes is disposed on the other face of said planar Piezo electric element opposite to said one face.

5. The combination as set forth in claim 4 wherein said pair of electrodes are disposed in an asymmetric arrangement about said common plane.

6. A device for detecting forces comprising in combination:

a) a container vessel including a cavity surrounded by a thin wall on one side and by rigid walls on other sides;

b) a force transmitting member extending from said thin wall for transmitting force laterally exerted thereon to said thin wall;

c) a planar Piezo electric element disposed generally parallel to said thin wall within said cavity and pressured towards said thin wall, said planar Piezo electric element including at least a first electrode disposed symmetrically about a plane including the central axis of said force transmitting member, a second electrode disposed on one side of said plane, and a third electrode disposed on the other side of said plane opposite to said one side; and d) at least three output means respectively connected to said first, second and third electrode;

whereby at least two signals respectively supplied by two of said three electrodes are combined to cancel noises and extract electrical signal representing forces laterally exerted on said force transmitting member.

7. The combination as set forth in claim 6 wherein said electrical signal is further combined with signal supplied by the remaining electrode of said three electrodes to further balance out noises.

8. The combination as set forth in claim 6 wherein said thin wall includes a reinforcing rib disposed diametrically thereacross on said plane.

9. The combination as set forth in claim 8 wherein said electrical signal is further combined with signal supplied by the remaining electrode of said three electrodes to further balace out noises.

10. A device for detecting forces comprising in combination:

a) a container vessel including a cavity surrounded by a thin wall on one side and by rigid walls on other sides;

b) a force transmitting member extending from said thin wall for transmitting force laterally exerted thereon to said thin wall;

c) a first planar Piezo electric element disposed generally parallel to said thin wall within said cavity and pressured towards said thin wall, said first planar Piezo electric element including at least a first electrode disposed generally on one side of a plane including the central axis of said force transmitting member and a second electrode disposed generally on the other side of said plane;

d) a second planar Piezo electric element disposed generally parallel to said first planar Piezo electric element and pressured towards said first planar Piezo electric element, wherein said first and second planar Piezo electrode are polarized in the same direction generally perpendicular to said thin wall, said second planar Piezo electric element including at least a first electrode disposed generally on said one side of said plane and a second electrode disposed generally on said the other side of said plane; wherein said first electrode of said first planar Piezo electric element and said second electrode of said second planar Piezo electric element are electrically connected to one another, and said second electrode of said first planar Piezo electric element and said first electrode of said second planar Piezo electric element are connected electrically to one another; and e) at least two output means respectively connected to said combination of said first electrode of said first planar Piezo electric element and said second electrode of said second planar Piezo electric element, and said second electrode of said first planar Piezo electric element and said first electrode of said second planar Piezo electric element:

whereby two signals respectively supplied by said pair of combinations of electrodes are combined to cancel noises and extract electrical signals representing forces laterally exerted on said force transmitting member.

11. The combination as set forth in claim 10 wherein said thin wall includes a reinforcing rib disposed diametrically thereacross on said plane.

* * * * *